US012766854B2

(12) United States Patent
Joko et al.

(10) Patent No.: US 12,766,854 B2
(45) Date of Patent: Oct. 20, 2026

(54) PRINTING DEVICE AND PRINTING METHOD

(71) Applicant: SEIKO EPSON CORPORATION, Tokyo (JP)

(72) Inventors: Takumi Joko, Shiojiri (JP); Shun Sakaihara, Shiojiri (JP); Yuya Nakamura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 217 days.

(21) Appl. No.: 18/616,244

(22) Filed: Mar. 26, 2024

(65) Prior Publication Data

US 2024/0326463 A1 Oct. 3, 2024

(30) Foreign Application Priority Data

Mar. 28, 2023 (JP) ................................ 2023-051106

(51) Int. Cl.
*B41J 2/21* (2006.01)

(52) U.S. Cl.
CPC ........... *B41J 2/2139* (2013.01); *B41J 2/2121* (2013.01); *B41J 2/2135* (2013.01)

(58) Field of Classification Search
CPC .............................. B41J 2/2139; B41J 2/2121
USPC ............................................................ 347/14
See application file for complete search history.

(56) References Cited

U.S. PATENT DOCUMENTS

2005/0185012 A1 8/2005 Yoshida

FOREIGN PATENT DOCUMENTS

JP 2005-205691 A 8/2005
JP 2017148943 A * 8/2017 ............ B41J 19/145

* cited by examiner

*Primary Examiner* — Douglas X Rodriguez
*Assistant Examiner* — Rami A Alshoroogi
(74) *Attorney, Agent, or Firm* — Spencer Fane LLP

(57) ABSTRACT

A printing device includes a print head including a plurality of nozzles configured to eject liquid onto a medium; a carriage on which the print head is mounted and which is configured to reciprocate along a predetermined main scanning direction; and a control section that controls ejection of liquid by the print head, wherein the control section prints a test pattern on the medium by main scanning, which is an ejection operation of liquid by the print head in accordance with movement of the carriage along the main scanning direction, acquires an unevenness position, which is a position in the main scanning direction where density unevenness in an intersecting direction, which intersects the main scanning direction, occurs in a print result of the test pattern, and corrects an ejecting amount of liquid for the unevenness position by the print head in accordance with the density unevenness.

7 Claims, 8 Drawing Sheets

PRINTING DEVICE AND PRINTING METHOD

The present application is based on, and claims priority from JP Application Serial Number 2023-051106, filed Mar. 28, 2023, the disclosure of which is hereby incorporated by reference herein in its entirety.

BACKGROUND

1. Technical Field

The present disclosure relates to a printing device and a printing method.

2. Related Art

An inkjet printer is known in which a print head performs printing by ejecting liquid from a plurality of nozzles onto a medium while moving the print head in a main scanning direction. According to such a printer, an image is printed on a medium by arranging a plurality of raster lines, which are configured of a plurality of dots arranged along the main scanning direction, in an intersecting direction intersecting the main scanning direction.

In the related art, a process of setting a correction value for correcting variation in density in the intersecting direction, that is, density of each raster line, and forming dots of the corresponding raster line so as to have the density corrected based on the correction value is performed (refer to JP-A-2005-205691).

However, in the print result using the above-described print head, line-like density unevenness may occur continuously in the intersecting direction. An improvement for suppressing such density unevenness is required.

SUMMARY

A printing device includes a print head including a plurality of nozzles configured to eject liquid onto a medium; a carriage on which the print head is mounted and which is configured to reciprocate along a predetermined main scanning direction; and a control section that controls ejection of liquid by the print head, wherein the control section prints a test pattern on the medium by main scanning, which is an ejection operation of liquid by the print head in accordance with movement of the carriage along the main scanning direction, acquires an unevenness position, which is a position in the main scanning direction where density unevenness in an intersecting direction, which intersects the main scanning direction, occurs in a print result of the test pattern, and corrects an ejecting amount of liquid for the unevenness position by the print head in accordance with the density unevenness.

A printing method for performing printing by controlling a print head including a plurality of nozzles configured to eject liquid onto a medium, the printing method includes a test pattern printing step of printing a test pattern on the medium by main scanning which is an ejection operation of liquid by the print head in accordance with movement of the print head along a predetermined main scanning direction; an unevenness position acquiring step of acquiring an unevenness position which is a position in the main scanning direction where density unevenness facing an intersecting direction intersecting the main scanning direction occurs in a print result of the test pattern; and a correcting step of correcting an ejecting amount of liquid for the unevenness position by the print head in accordance with the density unevenness.

DESCRIPTION OF EMBODIMENTS

Hereinafter, embodiments of the present disclosure will be described with reference to the drawings. Each of the drawings is merely an example for explaining the present embodiment. Since each drawing is an example, the ratio, the shape, and the shading may not be accurate, may not match each other, or may be partially omitted.

1. Device Configuration

Figure 1:
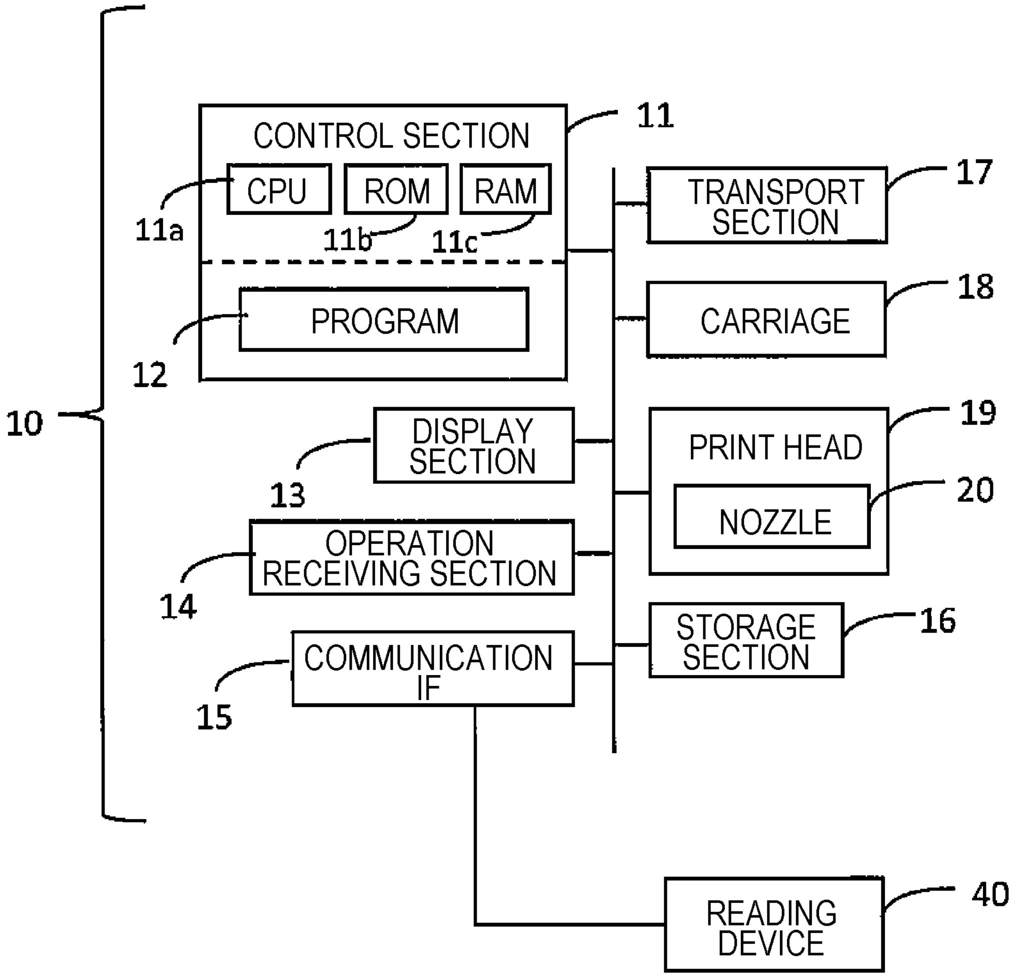
FIG. 1 is a diagram schematically showing a configuration of a device.

FIG. 1 schematically shows a configuration of a printing device 10 according to the present embodiment. The printing device 10 includes a control section 11, a display section 13, an operation receiving section 14, a communication IF 15, a storage section 16, a transport section 17, a carriage 18, a print head 19, and the like. IF is an abbreviation for interface. The control section 11 is configured to include one or a plurality of ICs including a CPU 11*a*, a ROM 11*b*, a RAM 11*c*, and the like as processors, other nonvolatile memories, and the like.

In the control section 11, a processor, that is, the CPU 11*a*, controls the printing device 10 by executing arithmetic processing in accordance with one or more programs 12 stored in the ROM 11*b* or other memories using the RAM 11*c* or the like as a work area. The processor is not limited to one CPU, and may be configured to perform processing by a plurality of CPUs or a hardware circuit such as an ASIC, or may be configured to perform processing in cooperation with a CPU and a hardware circuit.

The display section 13 is a unit for displaying visual information, and is constituted by, for example, a liquid crystal display, an organic EL display, or the like. The display section 13 may be configured to include a display and a drive circuit for driving the display. An operation receiving section 14 is a unit for receiving an operation by a user, and is realized by, for example, a physical button, a touch panel, a mouse, a keyboard, or the like. Of course, the touch panel may be realized as one function of the display section 13.

The communication IF 15 is a generic name of one or a plurality of IFs for connecting the printing device 10 to an external device by wire or wireless in accordance with a predetermined communication protocol including a known communication standard. The external devices are various communication devices such as a personal computer, a server, a smartphone, and a tablet terminal. In the example of FIG. 1, the printing device 10 is communicably connected to a reading device 40, which is a type of external device, via the communication IF 15. Of course, the number of external devices connectable via the communication IF 15 is not limited to one. The reading device 40 may be a part of a configuration included in the printing device 10.

The storage section 16 is constituted by a storage device such as a hard disk drive or a solid state drive. The storage section 16 may be a part of a memory of the control section 11. The storage section 16 may be regarded as a part of the control section 11. The storage section 16 stores various kinds of information necessary for controlling the printing device 10.

The transport section 17 is a unit for transporting a medium in a predetermined transport direction, and includes a rotating roller and a motor for rotating the roller or the like. Hereinafter, upstream and downstream of transportation are simply referred to as upstream and downstream. A medium is typically a paper sheet, but it is possible to employ, as the medium, various materials, such as a fabric, a film, and the like, which can be an object to be printed by liquid. The transport direction is also referred to as a sub-scanning direction. The transport section 17 may be a mechanism for transporting a medium on a belt or a pallet.

The carriage 18 is a mechanism capable of reciprocating along a predetermined main scanning direction by receiving power from a carriage motor (not shown). The main scanning direction and the transport direction intersect each other. When the main scanning direction is used as a reference, the transport direction corresponds to an "intersecting direction". The intersection between the main scanning direction and the transport direction may be understood to be orthogonal or substantially orthogonal. A print head 19 is mounted on the carriage 18. Therefore, the print head 19 reciprocates along the main scanning direction together with the carriage 18. The movement of the print head 19 is synonymous with the movement of the carriage 18.

The print head 19 includes a plurality of nozzles 20 capable of ejecting liquid. The nozzles 20 ejects dots which are droplets. The print head 19 ejects liquid based on print data for printing an image under the control of the control section 11. As is known, the control section 11 controls application of a drive signal to a driving element (not shown) included in each nozzle 20 in accordance with print data to eject or not eject dots from each nozzle 20, thereby printing an image on a medium. The print head 19 can eject ink of each color, for example, cyan (C) ink, magenta (M) ink, yellow (Y) ink, and black (K) ink.

The print data is data that defines ejection or non-ejection of dots for each pixel and each color of ink. Ejection of dots is also referred to as dot-on, and non-ejection of dots is referred to as dot-off. As is known, the nozzles 20 can eject dots of a plurality of different sizes. For example, the nozzle 20 can eject dots of three kinds of sizes referred to a large dot, a medium dot, and a small dot. In this example, the large dot is the maximum size and the small dot is the minimum size. In this case, dot-on information of a pixel in the print data is further classified into any one of large dot-on, medium dot-on, and small dot-on. Of course, the color of the ink ejected by the print head 19 is not limited to CMYK, and dot size is not limited to three types. The print head 19 can eject various kinds of liquid including ink and liquid not corresponding to ink.

Figure 2:
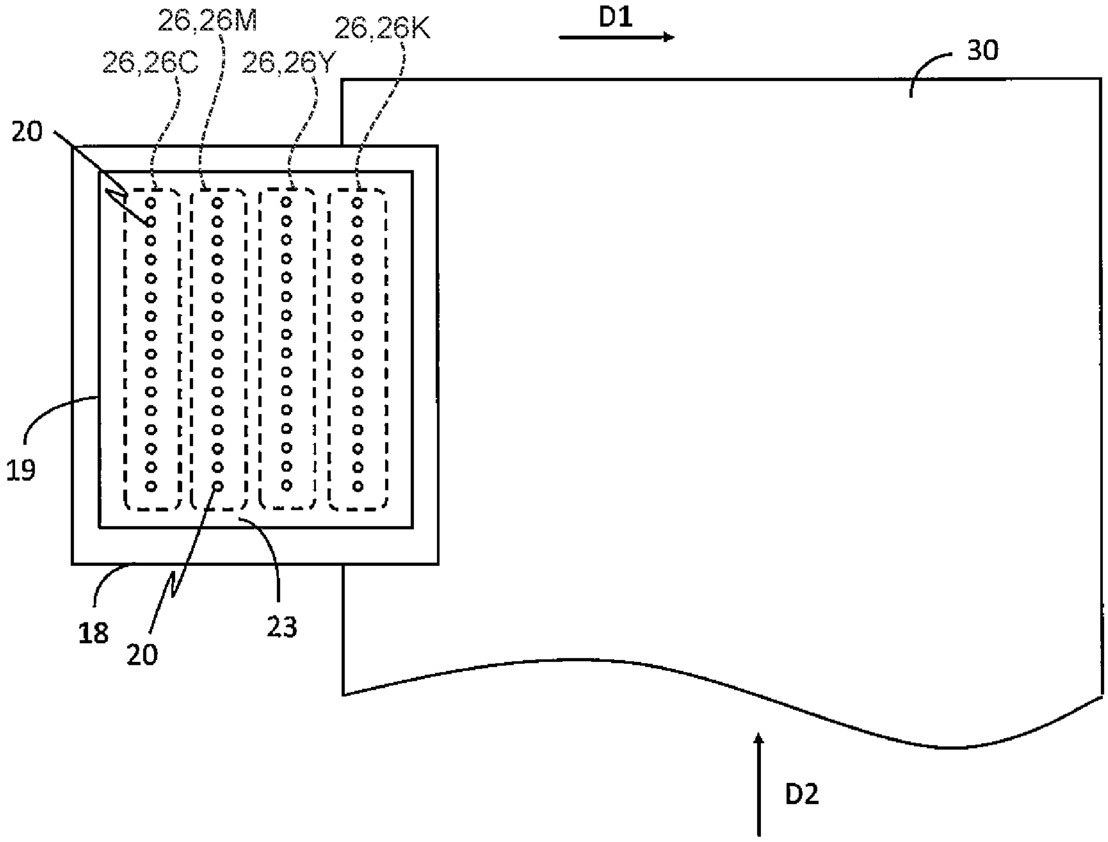
FIG. 2 is a view showing a relationship between a medium and a print head from a viewpoint from above.

FIG. 2 schematically shows the relationship between a medium 30 and the print head 19 from the viewpoint from above. The print head 19 mounted on the carriage 18 performs forward path movement from one end to the other end in a main scanning direction D1 and return path movement from the other end to one end in the main scanning direction D1 together with the carriage 18. FIG. 2 shows an example of the arrangement of the nozzles 20 on a nozzle surface 23. The nozzle surface 23 is a lower surface of the print head 19 and a surface facing the medium 30. The individual small circles in the nozzle surface 23 represent the individual nozzles 20.

The print head 19 includes a nozzle array 26 for each ink color in a configuration in which ink of each color is supplied from a liquid holding unit (not shown) referred to an ink cartridge, an ink tank, or the like and ejected from the nozzles 20. FIG. 2 shows an example of the print head 19 that ejects CMYK inks. The nozzle array 26 including the nozzles 20 that eject the C ink is a nozzle array 26C. Similarly, the nozzle array 26 including the nozzles 20 that eject M ink is a nozzle array 26M, the nozzle array 26 including the nozzles 20 that eject Y ink is a nozzle array 26Y, and the nozzle array 26 including the nozzles 20 that eject K ink is a nozzle array 26K.

In the example of FIG. 2, the nozzle arrays 26C, 26M, 26Y, and 26K are arranged along the main scanning direction D1. A plurality of nozzle arrays 26 for each color are arranged at the same position in a transport direction D2. One nozzle array 26 is configured by a plurality of nozzles 20 in which a nozzle interval which is an interval between the nozzles 20 in the transport direction D2 is constant or substantially constant.

A direction in which the plurality of nozzles 20 constituting the nozzle array 26 are arranged is also referred to as a nozzle arrangement direction. In the example of FIG. 2, the nozzle arrangement direction is parallel to the transport direction D2. Therefore, it can be said that the plurality of nozzles 20 constituting the nozzle array 26 are arranged in the transport direction D2. In this configuration, the nozzle arrangement direction is orthogonal to the main scanning direction D1. However, the nozzle arrangement direction may not be parallel to the transport direction D2, but may be oblique thereto. It can be said that the nozzle arrangement direction intersects the main scanning direction D1 regardless of whether or not the nozzle arrangement direction is parallel to the transport direction D2, and that the plurality of nozzles 20 constituting the nozzle array 26 are arranged at a predetermined nozzle interval in the transport direction D2. Therefore, even when the nozzle arrangement direction is oblique to the transport direction D2, it is interpreted that the plurality of nozzles 20 constituting the nozzle array 26 are also arranged in the transport direction D2.

An operation in which the print head 19 ejects liquid together with the movement of the carriage 18 along the main scanning direction D1 is referred to as a main scanning. The main scanning may be referred to as a path. The main scanning by the forward path movement of the carriage 18 is referred to as a forward path, and the main scanning by the return path movement of the carriage 18 is referred to as a return path. An operation in which the transport section 17 transports the medium 30 downstream by a predetermined distance between the paths is referred to as a paper feed. The control section 11 controls the print head 19, the carriage 18, and the transport section 17 to perform a path and a paper feed, thereby printing a two dimensional image on the medium 30. Alternatively, the carriage 18 may be configured to be capable of reciprocating not only in the main scanning direction D1 but also in the transport direction D2, and to have the same effect as the paper feed by moving upstream relative to the medium 30. Such relative movement between the medium 30 and the print head 19 in the transport direction D2, that is, the sub-scanning direction D2, is also referred to as a sub-scanning.

The configuration of the printing device 10 shown in FIG. 1 may be realized by a single printer or a plurality of devices communicatively connected to each other. In other words, the printing device 10 may actually be a printing system 10. The printing system 10 includes, for example, a printing control device functioning as the control section 11, and a printer including the transport section 17, the carriage 18, the print head 19, and the like. A printing method is realized by the printing device 10 or the printing system 10.

2. Printing Method

Figure 3:
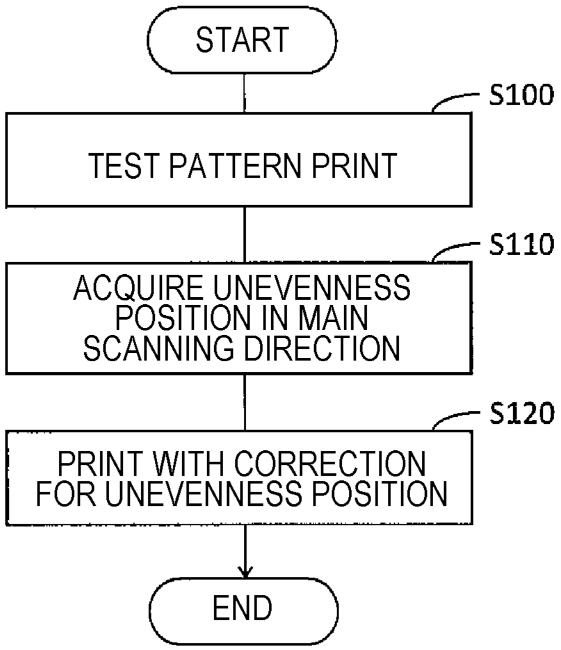
FIG. 3 is a flowchart showing a printing method of the present embodiment.

FIG. 3 is a flowchart showing the printing method of the present embodiment executed by the control section 11 in accordance with a program 12.

In step S100, the control section 11 controls the carriage 18 and the print head 19 to print a test pattern on the medium 30 by a predetermined number of main scans. At this time, the print head 19 ejects ink based on test pattern print data, which is print data for printing a test pattern, to print the test pattern. Step S100 corresponds to a "test pattern printing step".

Image data representing a test pattern is prepared in advance and stored, for example, in the storage section 16. The control section 11 may generate test pattern print data by appropriately executing halftone process or the like on image data of a test pattern. Test pattern print data is data for printing a solid image having a uniform density. An image of the uniform density is not limited to an image of the maximum density in which all pixels are large dot-on, but may be an image of other densities, for example, an image of a density lower than the maximum density in which 50% of pixels are dot-on.

Figure 4:
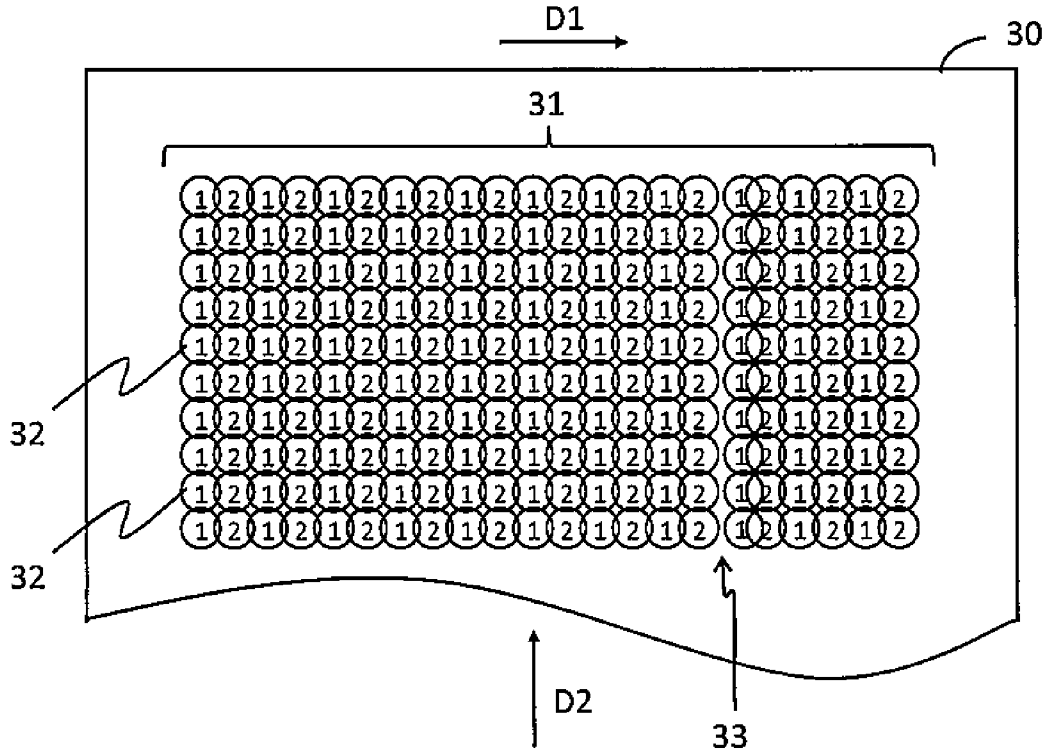
FIG. 4 is a diagram showing an example of a test pattern printed in step S100.

FIG. 4 shows an example of a test pattern 31 printed on the medium 30 in step S100. The test pattern 31 shown in FIG. 4 is a test pattern printed by ejecting K ink dots from the nozzles 20 of the nozzle array 26K corresponding to the K ink. In FIG. 4, individual circles represent individual dots 32. The dots 32 constituting the test pattern 31 are all medium dots, for example. In an actual print result, individual dots 32 cannot be clearly identified as shown in FIG. 4, but each dot 32 is clearly shown here.

The test pattern 31 is printed by two main scans. In FIG. 4, for the sake of convenience, numbers "1" and "2" are written in the circles of the dots 32. The number "1" indicates the dot 32 formed on the medium 30 by the forward path, and the number "2" indicates the dot 32 formed on the medium 30 by the return path. In other words, the test pattern 31 is printed by so-called bidirectional print by the forward path and the return path. In each raster line constituting the test pattern 31, the dots 32 formed by the forward path and the dots 32 formed by the return path are alternately arranged along the main scanning direction D1. The raster line is a pixel array in which a plurality of pixels is arranged along the main scanning direction D1 in print data, or an arrangement of dots represented by such a pixel array.

For convenience of description, the left side in FIG. 2 and FIG. 4 is referred to as one end side in the main scanning direction D1, the right side in FIG. 2 and FIG. 4 is referred to as the other end side in the main scanning direction D1, and the one end side and the other end side in the main scanning direction D1 may be referred to simply as left and right, hereinafter. Therefore, the print head 19 moves from left to right in the forward path, and from right to left in the return path.

According to the example of FIG. 4, in the test pattern 31, as indicated by reference numeral 33, a white line 33 which is continuous in the transport direction D2 is generated. A white line is a name of a line-like density unevenness that is relatively lighter than the surrounding density in a print result, and is not necessarily white. A black line is a name of a line-like density unevenness that is relatively thicker than the surrounding density in a print result, and is not necessarily black. The white line 33 shown in FIG. 4 is generated because the dots 32 ejected from the nozzles 20 at a certain timing in the forward path are shifted to the right from a position where the medium 30 should be landed originally, and the distance between the dot 32 and another dot 32 positioned to the left of the dot 32 is larger than the original distance.

Such line-like density unevenness in the transport direction D2, such as the white line 33, is caused by a temporary loss of stability of speed of the carriage 18 or vibration of the carriage 18 during a path. Temporary instability or vibration of speed of the carriage 18 may be caused by, for example, a distortion of a shaft that guides the carriage 18 in parallel with the main scanning direction D1, a dimensional error or eccentricity of each member that transmits power for movement to the carriage 18, or the like, and the contents or presence or absence of such factors are different for each product of the printing device 10. Therefore, the flowchart of FIG. 3 is a process performed for each individual printing device 10.

In step S110, the control section 11 acquires an "unevenness position" which is the position in the main scanning direction D1 where the density unevenness facing an intersecting direction of the main scanning direction D1 occurs in the print result of the test pattern in step S100. Step S110 corresponds to an "unevenness position acquiring step". Specifically, a user sets the medium 30 on which the test pattern 31 is printed on the reading device 40, and causes the reading device 40 to read the test pattern 31. The reading device 40 is a unit capable of reading an object and generating information on the color and luminance of the object as read data, and is, for example, a scanner. The control section 11 acquires test pattern read data, which is read data of the test pattern 31, from the reading device 40 via the communication IF 15, for example, and analyzes the test pattern read data.

The control section 11 acquires, for example, the luminance fluctuation along the main scanning direction D1 in the test pattern 31 from test pattern read data at a plurality of positions in the transport direction D2, and determines whether or not there is a luminance fluctuation corresponding to a white line or a black line, that is, whether or not there is a white line or a black line facing the transport direction D2. It is assumed that information such as a threshold necessary for detecting the luminance fluctuation corresponding to a white line or a black line is prepared in advance in the storage section 16 or the like. When a white line is detected from test pattern read data, the control section 11 acquires a position of the white line in the main scanning direction D1 as an unevenness position in association with the white line, and stores the unevenness position in the storage section 16. When a black line is detected from test pattern read data, the control section 11 acquires a position of the black line in the main scanning direction D1 as an unevenness position in association with the black line, and stores the unevenness position in the storage section 16. An unevenness position in test pattern read data is a pixel position with respect to a predetermined reference, for example, the left end of the test pattern read data or the left end of the medium 30 in the test pattern read data.

The control section 11 may acquire and store the type of density unevenness and an unevenness position by a visual evaluation of a user. That is, a user visually checks the test pattern 31 printed on the medium 30, and determines presence or absence of a white line or a black line facing the transport direction D2. Then, the user operates the operation receiving section 14 to input a position of a white line and a position of a black line in the main scanning direction D1 to the printing device 10. When a user visually evaluates the test pattern 31 as described above, the control section 11 receives the input of the type of density unevenness and the unevenness position from the user through the operation receiving section 14, which corresponds to step S110. The control section 11 stores the type of density unevenness and the unevenness position input by a user in the storage section 16.

In order for a user to easily grasp positions of a white line and a black line, a scale in the main scanning direction D1 may be printed on the medium 30 together with the test pattern 31 in step S100. With such a scale, a user can input a numeric value of the scale corresponding to a position of the white line or the black line as an unevenness position.

When the printed test pattern 31 has no density unevenness facing an intersecting direction of the main scanning direction D1, step S110 and step S120 (to be described later) are not executed. Here, the description will be continued on the assumption that such density unevenness occurs in the test pattern 31. In the description of the flowchart of FIG. 3, printing of the test pattern 31 with the K ink and a correction of an ejecting amount of the K ink based on an unevenness position in the test pattern 31 will be described, but it is needless to say that printing of the test pattern 31, acquisition of an unevenness position, and a correction of an ejecting amount are similarly executed for the ink of other colors such as CMY.

In step S120, the control section 11 performs printing with correction of an ejecting amount of liquid for an unevenness position acquired in step S110. Step S120 includes a "correcting step" of correcting an ejecting amount of liquid for an unevenness position by the print head 19 in accordance with density unevenness. An image to be printed in step S120 is an image arbitrarily selected as a print target by a user through an operation of the operation receiving section 14. Of course, a user may also select a test pattern as a print target here. The control section 11 acquires image data representing an image selected by a user, and executes image process for converting the image data into print data. As is known, the image process referred to here includes, for example, resolution conversion process, color conversion process, halftone process, and the like. Then, the control section 11 prints an image by ejecting ink from the print head 19 onto the medium 30 by main scanning based on print data. In a process of such step S120, the control section 11 performs correction necessary for increasing or decreasing an ejecting amount of liquid for the unevenness position acquired in step S110.

For example, as shown in FIG. 4, the control section 11 acquires an unevenness position of the white line 33 in the test pattern 31 printed with the K ink. In this case, the control section 11 performs correction to increase an ejecting amount of K ink for an unevenness position. A correction target is, for example, print data after halftone process. As described above, the print data is data in which dot-on or dot-off of ink is defined for each pixel. Therefore, the control section 11 performs printing on the basis of print data after performing correction such as increasing dot-on ratio or changing the dot size to a larger size with respect to pixel array position corresponding to an unevenness position of the white line 33 in the main scanning direction D1 in print data. In the present embodiment, unless otherwise specified, a pixel array refers to an array of pixels orthogonal to a raster line, that is, a pixel array facing the transport direction D2.

It is assumed that the correspondence relationship in the main scanning direction D1 between each unevenness position that can be acquired by analysis of test pattern read data or input from a user and each pixel position in print data in step S110 is known on the basis of the total number of pixels in the main scanning direction D1. It is sufficient that the control section 11 refers to this correspondence relationship, specifies a position in print data corresponding to the acquired unevenness position, and executes a correction.

It is also assumed that the control section 11 acquires an unevenness position of a black line in the test pattern 31 printed with the K ink. In this case, the control section 11 performs correction to reduce an ejecting amount of the K ink for an unevenness position. That is, the control section 11 performs printing on the basis of print data after performing correction such as reducing dot-on ratio or changing the dot size to a smaller size with respect to pixel array at a position corresponding to an unevenness position of a black line in the main scanning direction D1 in print data.

Figure 5:
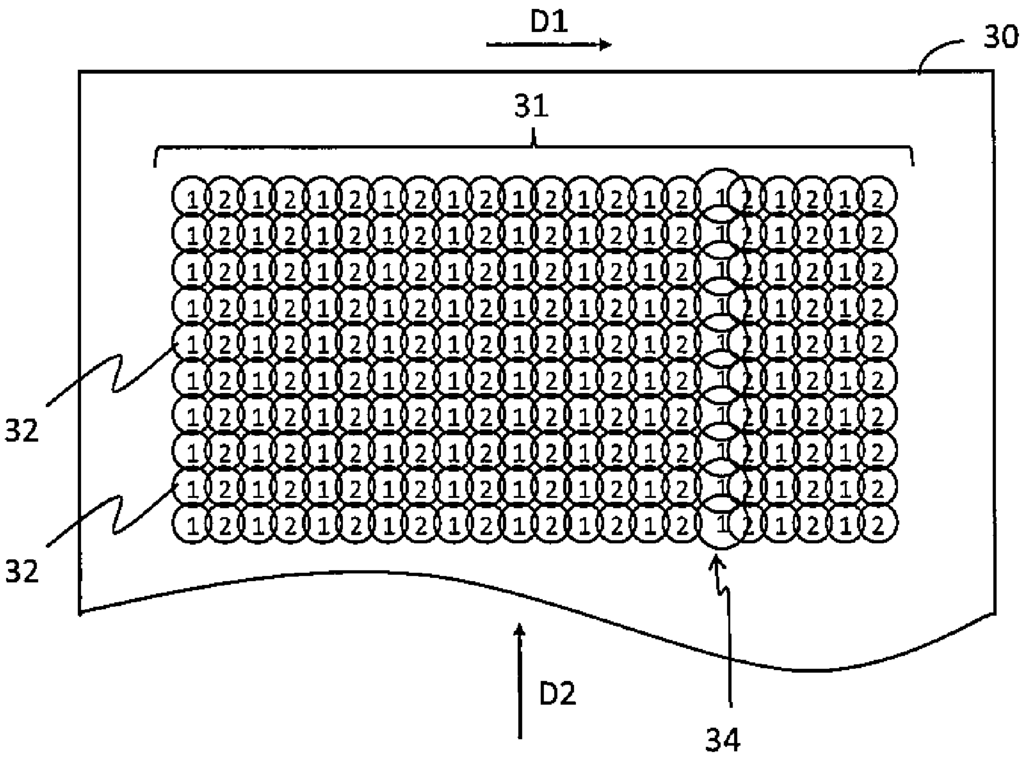
FIG. 5 is a diagram showing an example of a test pattern as a print result with a correction of step S120.

FIG. 5 shows an example of printing with correction in step S120. In FIG. 5, in order to facilitate comparison with FIG. 4, it is assumed that a user also instructs printing of a test pattern in step S120, and the test pattern 31 is printed on the medium 30 based on test pattern print data in the same manner as in step S100. The viewpoints of FIG. 5 and FIG. 6 (to be described later) are the same as those of FIG. 4. In step S120, the test pattern 31 is printed after correction for increasing an ejecting amount of the K ink for an unevenness position of the white line 33 in FIG. 4 is executed on test pattern print data. According to the example of FIG. 5, as a print result of a pixel array corresponding to an unevenness position of the white line 33 in the main scanning direction D1, a dot array 34 in which large dots larger than medium dots shown in FIG. 4 are arranged is formed, whereby the white line 33 is eliminated.

In step S110, the control section 11 may acquire not only presence or absence of a white line or a black line but also the degree of a white line or a black line, for example, presence of a weak white line, presence of a strong white line, presence of a weak black line, and presence of a strong black line, by analysis of test pattern read data or input from a user. In step S120, the control section 11 may change the degree of increase of an ink amount for an unevenness position in accordance with the acquired degree of a white line, or change the degree of decrease of an ink amount for an unevenness position in accordance with the acquired degree of a black line.

A correction target may not be print data, but may be image data in a state in which each pixel has a gradation value for each ink, before halftone process and after color conversion process. The gradation value is expressed, for example, in 256 gradations from 0 to 255, and indicates an ink amount. Among such image data, the control section 11 may increase or decrease an ejecting amount of ink as a result by increasing or decreasing a gradation value in accordance with an evaluation of presence of a white line or presence of a black line for a pixel array corresponding to an unevenness position acquired in step S110. Alternatively, when the same effect is obtained as a result of correcting image data after a color conversion process or print data after a halftone process, a correction target may be image data in a state having gradation values of, for example, red, green, blue (RGB) for each pixel before a color conversion process is performed.

The present embodiment described above is also referred to as a first embodiment. Several other embodiments are described below. Basically, the first embodiment is applied to the following embodiments, and differences from the first embodiment will be described.

3. Second Embodiment

When performing correction to increase an amount of liquid ejected to an unevenness position, the control section 11 may decrease an amount of liquid ejected by the print head 19 to at least one of positions adjacent to the unevenness position in the main scanning direction D1. When performing correction to decrease an amount of liquid ejected to an unevenness position, the control section 11 may increase an amount of liquid ejected by the print head 19 to at least one of positions adjacent to the unevenness position in the main scanning direction D1.

Figure 6:
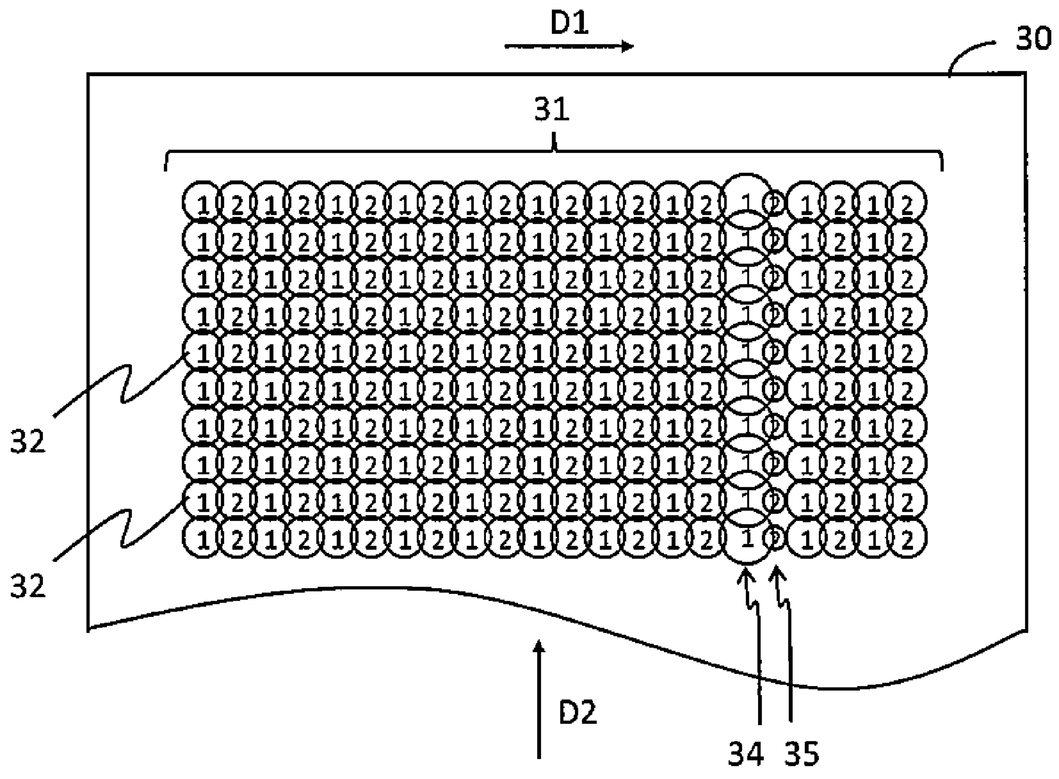
FIG. 6 is a diagram showing an example of a test pattern as a print result with a correction of step S120 in a second embodiment.

FIG. 6 shows an example of printing with correction in step S120 of a second embodiment. Also in the second embodiment, it is assumed that the test pattern 31 as shown in FIG. 4 is printed on the medium 30 in step S100, and the test pattern 31 as shown in FIG. 6 is printed on the medium 30 in step S120 after step S110. In a case where the white line 33 is generated in the test pattern 31 as in the example of FIG. 4, since a positional deviation of the dot 32 causing the white line 33 occurs, there is a high possibility that a black line is also generated in the vicinity of the white line 33. In the example of FIG. 4, the dot 32 of the number "1" formed by a forward path and generating the white line 33 is shifted to the right from an original position. Therefore, it can be said that the dot 32 of the number "1" overlaps the dot 32 of the number "2" formed by a return path more than necessary at a right side of the white line 33, and a black line is generated.

Therefore, in step S110, when the control section 11 acquires a certain position in the main scanning direction D1 as an unevenness position of the white line 33, the control section 11 also acquires a position adjacent to an unevenness position in the main scanning direction D1 as an unevenness position of a black line. When step S120 is executed in response to such a situation, as a result, the control section 11 performs correction to increase an ejecting amount of liquid for an unevenness position of a white line, and performs correction to decrease an ejecting amount of liquid for a position adjacent to the unevenness position in the main scanning direction D1. From a different point of view, it can also be said that the control section 11 performs correction to decrease an ejecting amount of liquid for an unevenness position of a black line, and performs correction to increase an ejecting amount of liquid for a position adjacent to the unevenness position in the main scanning direction D1.

That is, in step S120 of the second embodiment, the test pattern 31 is printed after correction for increasing an ejecting amount of the K ink for an unevenness position of the white line 33 of FIG. 4 and correction for decreasing an ejecting amount of the K ink for an unevenness position of a black line adjacent to the right of the white line 33 are executed on the test pattern print data. According to the example of FIG. 6, as a print result of a pixel array corresponding to an unevenness position of the white line 33 in the main scanning direction D1, the dot array 34 by large dots is formed similarly to FIG. 5, and a dot array 35 by small dots is formed as a print result of a pixel array adjacent to the right of the pixel array, whereby the white line 33 and a black line become inconspicuous. In the example of FIG. 6, an ejecting amount of ink may be decreased by reducing dot size by correcting print data for a pixel array adjacent to the dot array 34 on the side opposite to the dot array 35, or may be increased by increasing dot size by correcting print data for a pixel array adjacent to the dot array 35 on the side opposite to the dot array 34.

4. Third Embodiment

The control section 11 may increase an ejecting amount of liquid by the print head 19 for a position adjacent to an unevenness position in the main scanning direction D1 when performing correction of increasing an ejecting amount of liquid for an unevenness position when a pixel array in which a plurality of pixels are arranged in the intersecting direction corresponding to the unevenness position in print data which defines an ejecting amount of liquid by the print head 19 defines ejection of the dot of the maximum size among a plurality of sizes of the dots. The control section 11 may decrease an ejecting amount of liquid by the print head 19 for a position adjacent to an unevenness position in the main scanning direction D1 when performing correction of decreasing an ejecting amount of liquid for an unevenness position when a pixel array corresponding to the unevenness position in print data defines non-ejection of a dot.

Figure 7:
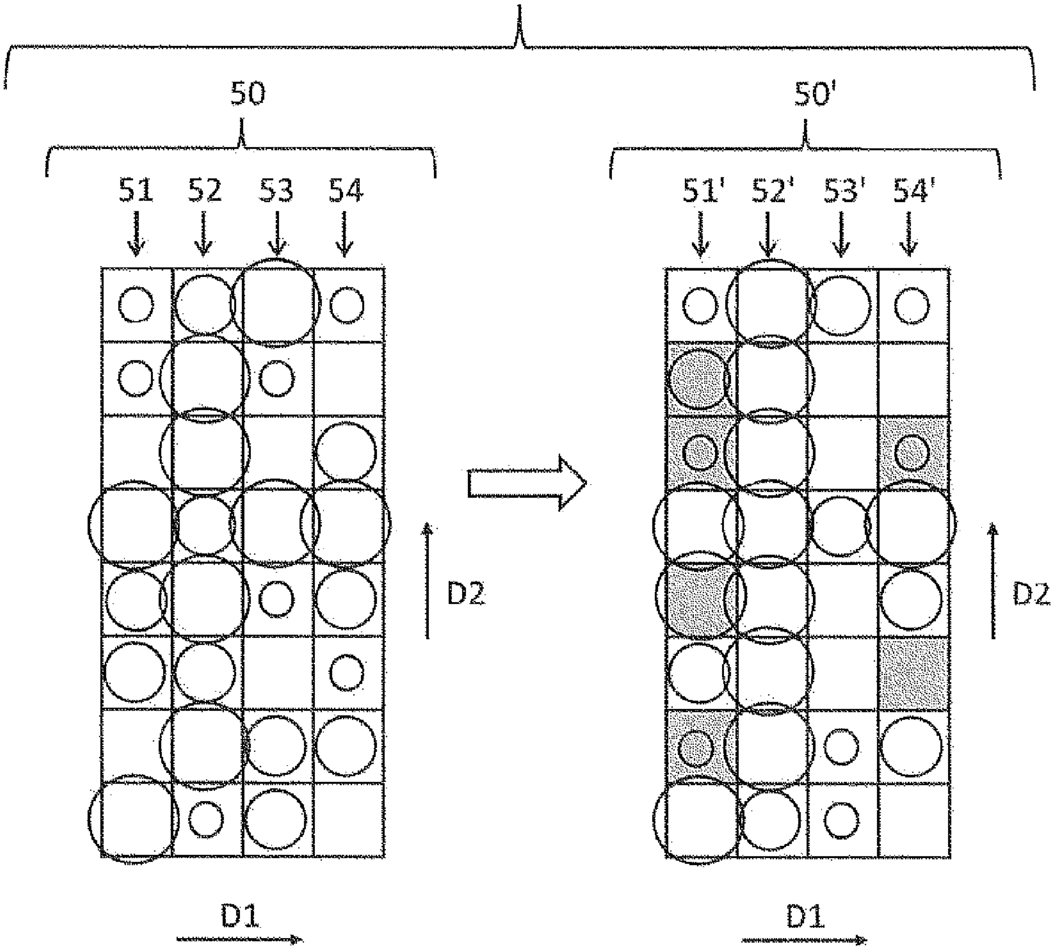
FIG. 7 is a diagram for explaining a correction of step S120 in a third embodiment.

FIG. 7 is a diagram for explaining a third embodiment, and shows a part of print data 50. The print data 50 is print data representing image to be print target in step S120, and the control section 11 corrects the print data 50 to obtain print data 50' in a process of step S120. The control section 11 causes the print head 19 to execute printing based on the print data 50'. Individual rectangles constituting the print data 50 and 50' are individual pixels, and in each pixel, a dot of a certain ink, for example, K ink is represented by a circle. FIG. 7 shows the difference among large dot-on, medium dot-on, and small dot-on depending on the size of the dot circle. A pixel having no dot is defined as a dot-off.

In the example of FIG. 7, the print data 50 includes pixel arrays 51, 52, 53, and 54 facing in the transport direction D2. The print data 50' includes pixel arrays 51', 52', 53', and 54' corresponding to the corrected pixel arrays 51, 52, 53, and 54. Here, it is assumed that the pixel array 52 is a pixel array corresponding to an unevenness position of the white line 33 acquired in step S110, and the pixel array 53 is a pixel array corresponding to an unevenness position of a black line acquired in step S110. As can be understood from the above description, in step S120, the control section 11 changes the dot size of each pixel of the pixel array 52 to a larger size or the like to obtain a corrected pixel array 52'. In addition, the control unit 11 changes the dot size of each pixel of the pixel array 53 to a smaller size or the like to obtain a corrected pixel array 53'.

However, it is not possible to further increase an ink amount for pixels for which large dots are defined among pixels of the pixel array 52. Therefore, in step S120, the control section 11 increases an ejecting amount of ink by changing the dot size to a larger size or the like for pixels of the pixel array 51 adjacent to the pixel array 52 and adjacent to pixels for which the large dots of the pixel array 52 are defined, and sets the pixels as the corrected pixel array 51'. It is not possible to further decrease an ink amount for pixels for which dot-off is defined among pixels of the pixel array 53. Therefore, in step S120, the control section 11 decreases an ejecting amount of ink by changing the dot size to a smaller size or the like for pixels of the pixel array 54 adjacent to the pixel array 53 and adjacent to pixels for which dot-off of the pixel array 53 are defined, and sets the pixels as the corrected pixel array 54'. In FIG. 7, for easy understanding, the pixels corrected in comparison with the pixel arrays 51 and 54 among the pixel arrays 51' and 54' of the print data 50' are painted in gray.

5. Fourth Embodiment

When the control section 11 performs correction of increasing an amount of liquid ejected to an unevenness position, the control section 11 may perform correction of changing dot size of each pixel to a larger size at a predetermined frequency lower than 100% along the intersecting direction with respect to a pixel array in which a plurality of pixels are arranged in the intersecting direction corresponding to the unevenness position in print data defining an amount of liquid ejected by the print head 19.

Figure 8:
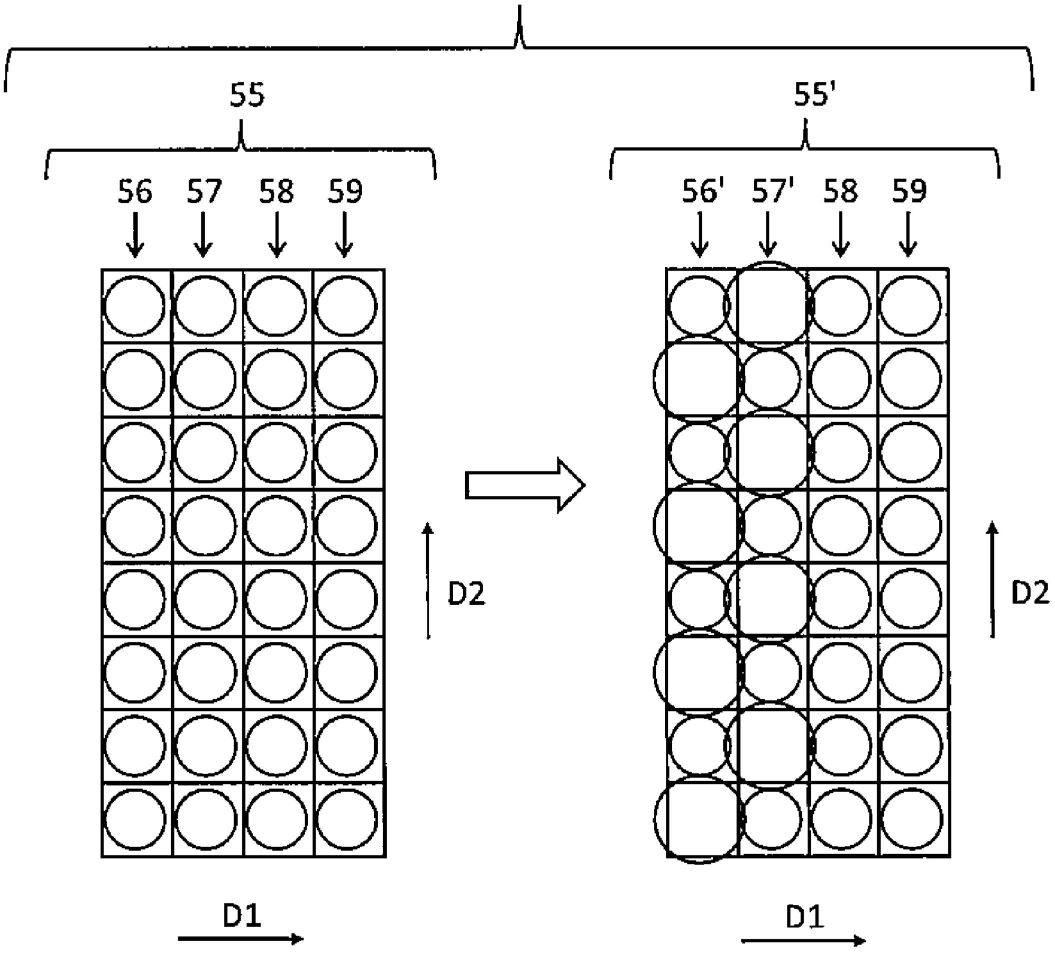
FIG. 8 is a diagram for explaining a correction of step S120 in a fourth embodiment.

FIG. 8 is a diagram for explaining a fourth embodiment, and shows a part of print data 55. The way of viewing FIG. 8 is the same as that of FIG. 7. It is assumed that the print data 55 represents an image to be print target in step S120, and is test pattern print data as in the first embodiment and second embodiment. In a process of step S120, the control section 11 corrects the print data 55 to obtain print data 55', and causes the print head 19 to perform printing based on the print data 55'.

In the example of FIG. 8, the print data 55 includes pixel arrays 56, 57, 58, and 59 facing the transport direction D2. The print data 55' includes corrected pixel arrays 56' and 57'. Here, it is assumed that the pixel array 57 is a pixel array corresponding to an unevenness position of the white line 33 acquired in step S110. In step S120 of the fourth embodiment, the control section 11 performs correction of changing the dot size of each pixel to a larger size at a predetermined frequency, for example, a frequency of 50%, with respect to the pixel array 57. In the example of FIG. 8, medium dots of each pixel of the pixel array 57 are changed to large dots every other pixel to form the pixel array 57'.

In light of the above description, it can be said that the pixel array 58 on a right side of the pixel array 57 corresponding to an unevenness position of the white line 33 corresponds to an unevenness position of a black line. Therefore, although not particularly shown in FIG. 8, the control section 11 can naturally execute correction for suppressing the black line as described above for the pixel array 58.

In the fourth embodiment, the control section 11 may further perform correction to change the dot size to a larger size for pixels adjacent to pixels that are not corrected to change the dot size of the pixel array 57 to a larger size, among the pixel arrays 56 that are adjacent pixel arrays in which a plurality of pixels are arranged in the transport direction D2 adjacent to the pixel array 57 to be corrected to increase an ejecting amount of liquid. The pixel array 56 is adjacent to the pixel array 57 on the opposite side of the pixel array 58. In other words, an ink amount that cannot be increased in the pixel array 57 is compensated by the increase in an ink amount in the pixel array 56. In the example of FIG. 8, the pixel array 57 and the pixel array 56 are alternately increased in dot size with respect to each pixel position along the transport direction D2 to form a pixel array 57' and a pixel array 56'.

6. Fifth Embodiment

The line-like density unevenness such as a white line or a black line facing the transport direction D2, which is assumed as a problem to be solved by the present embodiment, occurs when the constant speed of movement of the carriage 18 is temporarily impaired. In order to execute one main scanning, the carriage 18 has an acceleration period in which the speed is accelerated from zero to a predetermined speed, a constant speed period in which the predetermined speed is substantially maintained, and a deceleration period in which the speed is decelerated from the predetermined speed to zero, and ink ejection is mainly executed during the constant speed period. When the size of the medium 30 in the main scanning direction D1 is different, the distance of one main scanning is different, and the lengths of the acceleration period, the constant speed period, and the deceleration period are different. Therefore, even in one printing device 10, when the size of the medium 30 in the main scanning direction D1 is different, a position in the main scanning direction D1 where the density unevenness occurs may also be different.

Therefore, the control section 11 performs printing of the test pattern 31 and acquisition of an unevenness position for each of sheets of medium 30 having different sizes in the main scanning direction D1. That is, steps S100 and S110 are executed for each of the sheets of medium 30 having different sizes in the main scanning direction D1. The size of the medium 30 in the main scanning direction D1 is referred to as a medium width. The control section 11 may store density unevenness and the unevenness position acquired in step S110 in the storage section 16 in association with a medium width of the medium 30 used for printing the test pattern 31 in step S100.

Then, when the control section 11 performs printing on a first medium in step S120, the control section 11 performs printing while correcting an ejecting amount of liquid for unevenness position corresponding to the medium width of the first medium in accordance with density unevenness such as the white line or the black line at the unevenness position. Similarly, when the control section 11 performs printing on a second medium having a medium width different from that of the first medium in step S120, the control section 11 performs printing while correcting an ejecting amount of liquid for unevenness position corresponding to the medium width of the second medium in accordance with density unevenness such as the white line or the black line at the unevenness position.

7. Round-Up

As described above, according to the present embodiment, the printing device 10 includes the print head 19 including a plurality of nozzles 20 configured to eject liquid onto the medium 30, the carriage 18 on which the print head 19 is mounted and which is configured to reciprocate along a predetermined main scanning direction D1, and the control section 11 that controls ejection of liquid by the print head 19. The control section 11 prints the test pattern 31 on the medium 30 by main scanning, which is an ejection operation of liquid by the print head 19 in accordance with movement of the carriage 18 along the main scanning direction D1, acquires an unevenness position, which is a position in the main scanning direction D1 where density unevenness in an intersecting direction, which intersects the main scanning direction D1, occurs in a print result of the test pattern 31, and corrects an ejecting amount of liquid for the unevenness position by the print head 19 in accordance with the density unevenness.

According to the above configuration, the printing device 10 can suppress the occurrence of density unevenness facing the intersecting direction, which cannot be solved by the method in the related art of correcting the density unevenness for each raster line by a correction value for each raster line. In addition, it is naturally possible to use a method of acquiring a correction value of the density for each raster line similar to the related art and correcting the density for each raster line using the acquired correction value together with the present embodiment.

Further, when the print head 19 executes printing with the maximum resolution that can be realized in the main scanning direction D1, the density unevenness facing the intersecting direction such as the white line assumed in the present embodiment cannot be compensated by further increasing the number of times of ejection of dots. On the other hand, according to the correction of the present embodiment, it is possible to suppress the occurrence of such a white line.

Further, according to the present embodiment, the control section 11 may decrease an amount of liquid ejected by the print head 19 to at least one of the positions adjacent to the unevenness position in the main scanning direction D1 when performing correction to increase an amount of liquid ejected to the unevenness position, and increase an amount of liquid ejected by the print head 19 to at least one of the positions adjacent to the unevenness position in the main scanning direction D1 when performing correction to decrease an amount of liquid ejected to the unevenness position.

According to the above configuration, the printing device 10 performs correction opposite to the correction of an ejecting amount for an unevenness position in the vicinity of the unevenness position, thereby preventing image quality from being deteriorated due to the excessive correction.

According to the present embodiment, each of the plurality of nozzles 20 is configured to eject dots of liquid in a plurality of sizes.

When performing correction to increase an amount of liquid ejected to the unevenness position, the control section 11 may increase an amount of liquid ejected by the print head 19 to a position adjacent to the unevenness position in the main scanning direction D1 when a pixel array in which a plurality of pixels are arranged in the intersecting direction corresponding to the unevenness position in print data that defines the amount of liquid ejected by the print head 19 defines ejection of a maximum size dot among the plurality of sizes, and when performing correction to decrease an amount of liquid ejected to the unevenness position, the control section 11 may decrease an amount of liquid ejected by the print head 19 to a position adjacent to the unevenness position in the main scanning direction D1 when the pixel array corresponding to the unevenness position in the print data defines non-ejection of the dot.

According to the above configuration, when the printing device 10 cannot perform necessary correction of an ejecting amount for an unevenness position, the printing device 10 can supplement the necessary correction by performing an alternative correction in the vicinity of the unevenness position.

According to the present embodiment, when performing correction to increase an amount of liquid ejected to the unevenness position, the control section 11 may perform correction to change dot size of each pixel to a larger size at a predetermined frequency lower than 100% along the intersecting direction with respect to a pixel array in which a plurality of pixels are arranged in the intersecting direction corresponding to the unevenness position in print data that defines the amount of liquid ejected by the print head 19.

According to the above configuration, the printing device 10 can avoid the inconvenience that an amount of liquid on the medium 30 becomes too large as a result of the correction of a pixel array corresponding to an unevenness position and liquid is blurred. The predetermined frequency is 50% in the example described above, but may be other frequencies such as 75% or 60%. Further, the control section 11 performs correction to change dot size to a larger size with respect to a pixel adjacent to a pixel which is not corrected to change dot size of the pixel array to a larger size among adjacent pixel arrays corresponding to the unevenness position in which a plurality of pixels are arranged adjacent to the pixel array in the intersecting direction in the print data.

According to the above configuration, the printing device 10 can execute correction of a necessary amount while suppressing the occurrence of the above-described bleeding by performing correction of increasing an ejecting amount of liquid by distributing correction to a pixel array corresponding to an unevenness position and an adjacent pixel array.

According to the present embodiment, the control section 11 may print the test pattern and acquire the unevenness position for each of the medium 30 having different sizes in the main scanning direction D1, and when printing on a first medium, the control section 11 may correct an ejecting amount of liquid for the unevenness position corresponding to a size of the first medium in the main scanning direction D1 in accordance with the density unevenness.

According to the above configuration, the printing device 10 can appropriately execute correction for suppressing density unevenness occurring at an unevenness position in accordance with the medium width of the medium 30 to be used.

The control section 11 can also print the test pattern 31 and acquire an unevenness position for each printing direction adopted for printing. Here, printing directions are a forward path, a return path, a forward path, and a return path. The control section 11 can adopt not only a bidirectional print in which the forward path and the return path are alternately executed as described above, but also a unidirectional print in which printing is performed only by the forward path or a unidirectional print in which printing is performed only by the return path. For convenience, the bidirectional print is referred to as a first printing mode, the unidirectional print of the forward path is referred to as a second printing mode, and the unidirectional print of the return path is referred to as a third printing mode.

The control section 11 executes steps S100 and S110 for each of the first printing mode, the second printing mode, and the third printing mode, and stores the density unevenness and the unevenness position acquired in step S110 in the storage section 16 in association with the printing mode adopted for printing the test pattern 31 in step S100. When a certain printing mode is adopted and printing is performed on the medium 30 in step S120, the control section 11 performs printing while correcting an ejecting amount of liquid at an unevenness position corresponding to the printing mode adopted at that time according to the density unevenness such as a white line or a black line at the unevenness position. Thus, the printing device 10 can appropriately execute correction for suppressing density unevenness occurring at an unevenness position in accordance with a printing mode.

Although only a part of the combinations of claims is described in the claims, the present embodiment naturally includes various combinations of a plurality of dependent claims as well as one-to-one combinations of independent claims and dependent claims.

The present embodiment discloses, in addition to the printing device 10, a printing method and a program 12 for realizing the method in cooperation with a processor.

That is, a printing method for performing printing by controlling a print head 19 including a plurality of nozzles 20 configured to eject liquid onto a medium 30, the printing method includes a test pattern printing step of printing a test pattern on the medium 30 by main scanning which is an ejection operation of liquid by the print head 19 in accordance with movement of the print head 19 along a predetermined main scanning direction D1; an unevenness position acquiring step of acquiring an unevenness position which is a position in the main scanning direction D1 where density unevenness facing an intersecting direction intersecting the main scanning direction D1 occurs in a print result of the test pattern; and a correcting step of correcting an ejecting amount of liquid for the unevenness position by the print head 19 in accordance with the density unevenness.

What is claimed is:

1. A printing device comprising:

a print head including a plurality of nozzles configured to eject liquid onto a medium;

a carriage on which the print head is mounted and which is configured to reciprocate along a predetermined main scanning direction; and a control section that controls ejection of liquid by the print head, wherein the control section is configured to print a test pattern on the medium by main scanning, which is an ejection operation of liquid by the print head in accordance with movement of the carriage along the main scanning direction, acquire an unevenness position, which is a position in the main scanning direction where density unevenness extends along an intersecting direction in a print result of the test pattern, the intersecting direction intersecting, the main scanning direction, and correct an ejecting amount of liquid for a pixel array in which a plurality of pixels are arranged in the intersecting direction and which corresponds to the unevenness position by the print head in accordance with the density unevenness.

2. A printing device comprising:

a print head including a plurality of nozzles configured to eject liquid onto a medium;

a carriage on which the print head is mounted and which is configured to reciprocate along a predetermined main scanning direction; and a control section that controls ejection of liquid by the print head, wherein the control section prints a test pattern on the medium by main scanning, which is an ejection operation of liquid by the print head in accordance with movement of the carriage along the main scanning direction, acquires an unevenness position, which is a position in the main scanning direction where density unevenness extends along an intersecting direction in a print result of the test pattern, the intersecting direction intersecting the main scanning direction, and corrects an ejecting amount of liquid for the unevenness position by the print head in accordance with the density unevenness, and the control section, when performing correction to increase an amount of liquid ejected to the unevenness position, decreases an amount of liquid ejected by the print head to at least one of positions adjacent to the unevenness position in the main scanning direction and, when performing correction to decrease an amount of liquid ejected to the unevenness position, increases an amount of liquid ejected by the print head to at least one of the positions adjacent to the unevenness position in the main scanning direction.

3. The printing device according to claim 1, wherein each of the plurality of nozzles is configured to eject dots of liquid in a plurality of sizes and the control section, when performing correction to increase an amount of liquid ejected to the unevenness position, increases an amount of liquid ejected by the print head to a position adjacent to the unevenness position in the main scanning direction in a case in which the pixel array, in print data that defines the amount of liquid ejected by the print head, defines ejection of a maximum size dot among the plurality of sizes and the control section, when performing correction to decrease an amount of liquid ejected to the unevenness position, decreases an amount of liquid ejected by the print head to a position adjacent to the unevenness position in the main scanning direction in a case in which the pixel array in the print data corresponding to the unevenness position defines non-ejection of a dot.

4. The printing device according to claim 1, wherein each of the plurality of nozzles is configured to eject dots of liquid in a plurality of sizes and the control section, when performing correction to increase an amount of liquid ejected to the unevenness position, performs correction to change dot size of each pixel to a larger size at a predetermined frequency lower than 100% along the intersecting direction with respect to the pixel array in print data defining the amount of liquid ejected by the print head.

5. The printing device according to claim 4, wherein the control section performs correction to change dot size to a larger size with respect to a pixel adjacent to a pixel, of the pixel array, that is not corrected to change dot size to a larger size, among adjacent pixel arrays in which a plurality of pixels in the print data are arranged adjacent to the pixel array in the intersecting direction.

6. The printing device according to claim 1, wherein the control section prints the test pattern and acquires the unevenness position for each of medium having different sizes in the main scanning direction and, when printing on a first medium, the control section corrects an ejecting amount of liquid for the unevenness position corresponding to size of the first medium in the main scanning direction in accordance with the density unevenness.

7. A printing method for performing printing by controlling a print head including a plurality of nozzles configured to eject liquid onto a medium, the printing method comprising:

a test pattern printing step of printing a test pattern on the medium by main scanning which is an ejection operation of liquid by the print head in accordance with movement of the print head along a predetermined main scanning direction;

an unevenness position acquiring step of acquiring an unevenness position which is a position in the main scanning direction where density unevenness extends along an intersecting direction in a print result of the test pattern, the intersecting direction intersecting the main scanning direction; and a correcting step of correcting an ejecting amount of liquid for a pixel array in which a plurality of pixels are arranged in the intersecting direction and which corresponds to the unevenness position by the print head in accordance with the density unevenness.

* * * * *